United States Patent [19]
Pecoraro et al.

[11] Patent Number: 6,022,513
[45] Date of Patent: Feb. 8, 2000

[54] ALUMINOPHOSPHATES AND THEIR METHOD OF PREPARATION

[76] Inventors: Theresa A. Pecoraro, 3384 Deer Hollow Dr., Danville, Calif. 94506; Ignatius Y. Chan, 9 Pioneer Ct., Novato, Calif. 94945

[21] Appl. No.: 08/742,794

[22] Filed: Oct. 31, 1996

[51] Int. Cl.[7] .................................................. C01B 25/36
[52] U.S. Cl. .......................................... 423/311; 502/208
[58] Field of Search ............................ 423/311; 502/208

[56] References Cited

U.S. PATENT DOCUMENTS

| | | |
|---|---|---|
| 3,271,299 | 9/1966 | Kearby ..................... 423/311 |
| 3,342,750 | 9/1967 | Kearby . |
| 3,904,550 | 9/1975 | Pine . |
| 4,080,311 | 3/1978 | Kehl . |
| 4,219,444 | 8/1980 | Hill et al. . |
| 4,364,842 | 12/1982 | McDaniel et al. . |
| 4,419,268 | 12/1983 | McDaniel et al. . |
| 4,424,139 | 1/1984 | McDaniel et al. . |
| 4,504,638 | 3/1985 | McDaniel et al. . |
| 4,542,001 | 9/1985 | Iino et al. ................... 423/311 |
| 5,030,431 | 7/1991 | Glemza . |
| 5,292,701 | 3/1994 | Glemza et al. ............ 502/208 |
| 5,552,361 | 9/1996 | Rieser et al. .............. 502/208 |

FOREIGN PATENT DOCUMENTS 921104527  6/1992  European Pat. Off. .

OTHER PUBLICATIONS

Journal of Catalysis vol. 102, pp. 10–20 (1986) "The Structure of Coprecipitated Aluminophosphate Supports" T.T.P. Cheung et al.

*Primary Examiner*—Wayne Langel
*Attorney, Agent, or Firm*—R. C. Gaffney; W. K. Turner

[57] ABSTRACT

Disclosed is a new aluminophosphate composition which is (i) amorphous; (ii) has, on a microlevel, sheets of aluminophosphate as well as spheres. The new composition can be made, in one embodiment, by neutralizing a mixture of aluminum cations and phosphate anions with a base with vigorous mixing including shear forces sufficient to result in the formation of a mixture of sheets and spheres of aluminophosphate on a microlevel.

31 Claims, 7 Drawing Sheets

2 MICRON

Figure 4  2 MICRON

2 MICRON

1 MICRON

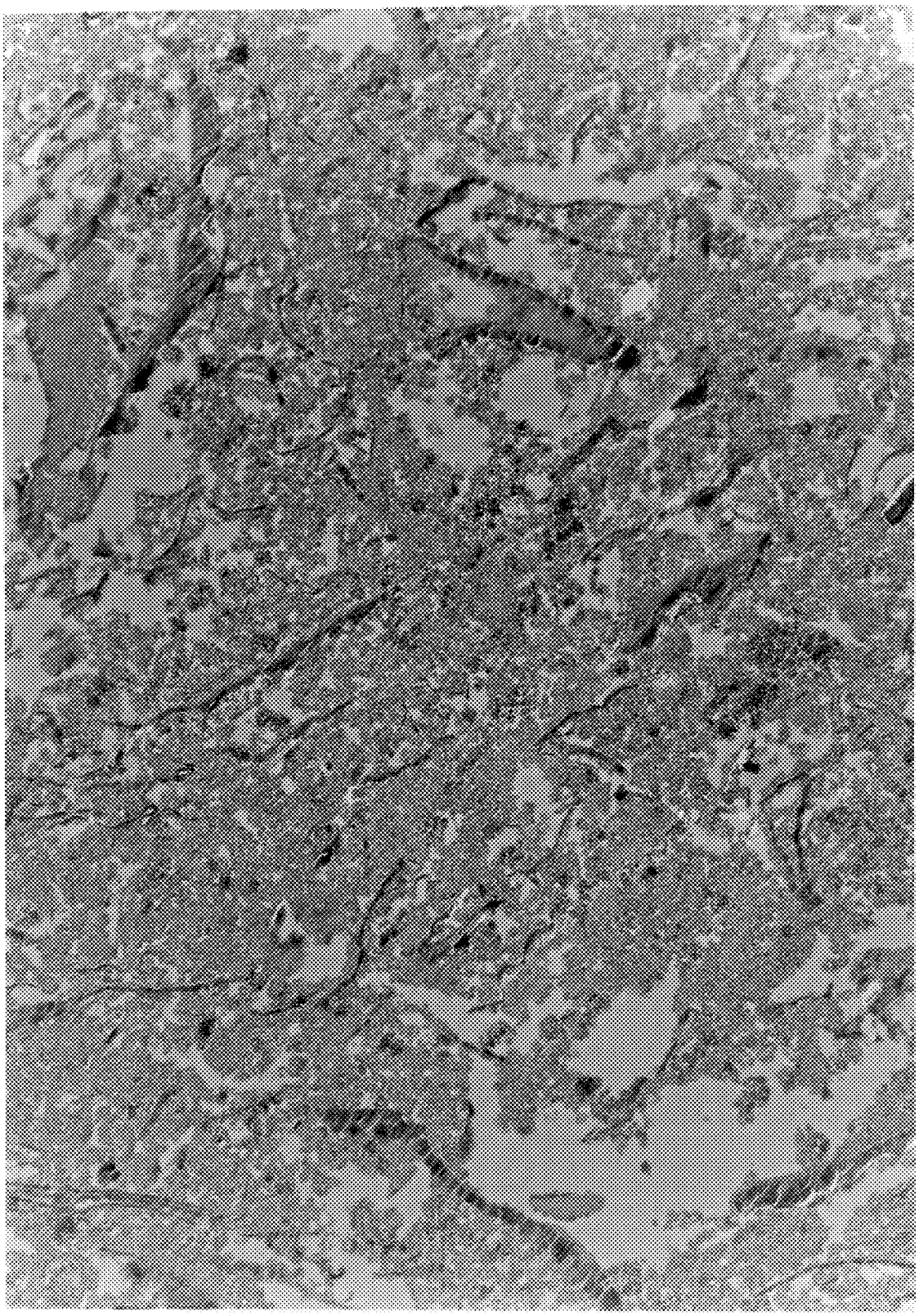
Figure 7  2 Micron

ALUMINOPHOSPHATES AND THEIR METHOD OF PREPARATION

FIELD OF THE INVENTION

This invention relates to new aluminophosphate compositions comprising, on a microlevel, sheets of aluminophosphate and their method of preparation involving a high rate of mixing with shear forces.

BACKGROUND OF THE INVENTION

Aluminophosphate gels and precipitates are old in the art. Examples of typical references include the following: U.S. Pat. No. 3,342,750 entitled "Compositions Containing Stable Aluminum Phosphate Gel and Methods of Making and Using Same" was issued Sep. 19, 1967 to K. K. Kearby and assigned to Esso Research and Engineering Company. This reference relates to high surface area aluminum phosphate gels and methods to make them and methods to use them. The aluminum phosphate gels have a surface area in the range of 200 to 600 square meters per gram. This appears to be the first reference where a true hydrogel of aluminum phosphate is prepared (see column 1, lines 53–55). Kearby's hydrogel is said to differ from the precipitates of the prior art which had relatively low surface area and poor heat stability. Kearby makes his hydrogels by the reaction of aluminum chloride and phosphoric acid with ethylene oxide.

U.S. Pat. No. 4,080,311, entitled "Thermally Stable Phosphate Containing Alumina Precipitates and Their Method of Preparation" was issued Mar. 21, 1978 to W. L. Kehl and was assigned to Gulf Research and Development Company. The Kehl reference refers to the teaching of Kearby and U.S. Pat. No. 3,904,550 to L. Pine (also Esso Research and Engineering Company). Pine, according to Kehl, relates that Kearby's hydrogels are "sensitive to water and difficult to form into a catalyst shape since they lose a substantial amount of their surface area during forming." Pine, again according to Kehl, teaches to use an aluminum alkoxide to make Kearby's hydrogels. Kehl teaches that such aluminum alkoxides are pyrophoric and thus difficult to handle. Kehl presents his own "simplified technique" to make an alumina-aluminum phosphate precipitate which comprises neutralizing a solution of aluminum cations and phosphorous anions at a controlled pH of 7 to 10. The resulting precipitates after drying and calcining have a surface area from 100 to 200 square meters per gram and an average pore radius from 75 to 150° Angstrom and are thermally stable.

FIGS. 1–9 of Kehl are typical photomicrographs of various alumina-aluminum phosphates prepared by Kehl's technique. Note the precipitates are "generally similar in appearance, but the particle size decreases as the alumina content increases" (Column 3, lines 51–56). The particles in the photomicrographs are spheroidal in appearance.

U.S. Pat. No. 4,219,444 entitled "Ethylene Polymerization Catalysts" issued Aug. 26, 1980 to R. W. Hill, William L. Kehl and T. J. Lynch and was assigned to Gulf Oil Corporation. The catalyst support is an amorphous precipitate of aluminum phosphate (column 2, lines 61, et seq.). Hill, et al. appear to distinguish between two related types of supports. Both types are amorphous aluminum phosphates. They appear to differ only in the mole ratio of aluminum to phosphorous in the starting aqueous acidic medium containing the aluminum cations and phosphate anions. In the first type the aluminum to phosphorous mole ratio in the starting solution is "substantially equal" (column 3, lines 4–5). In the second type the aluminum to phosphorous mole ratio in the starting solution is from about 5:1 to substantially 1:1 (column 4, lines 5–11). In both types the preparation is substantially the same as in the Kehl reference discussed about except the pH can be from 4 to 11 (rather than 7 to 11). The photomicrographs (FIGS. 1 and 2 of Hill, et al.) are similar to those in the Kehl '311 patent i.e. solely spheres of aluminum phosphate are present in the microstructure. These photomicrographs of Hill et al and Kehl are incorporated herein by reference.

As will be illustrated below, in chronological order, the emerging prior art after the Kehl '311 patent and the Hill et al '444 patent, added co-catalysts or other "improvements" but the thread woven through all of the prior art is the Kehl method of making the aluminophosphates. As noted above, the Kehl method is to neutralize an aqueous solution of aluminum cations and phosphate anions with a base as per Kehl in U.S. Pat. No. 4,080,311 or Hill et al in U.S. Pat. No. 4,219,444.

(1) U.S. Pat. No. 4,364,842 entitled "Phosphate Supported Chromium Catalyst" issued Dec. 21, 1982 to Max P. McDaniel, et al. of Phillips Petroleum Company. This reference relates to the use of a phosphate supported chromium catalyst for olefin polymerization. McDaniel, et al. refer to the Hill, et al. '444 patent for a method to prepare their phosphate support (see column 2, lines 38 et seq.). Thus, McDaniel, et al. do not advance the art regarding how to make improved aluminum phosphates but rather rely on old methods such as those disclosed in the Hill, et al. reference.

(2) U.S. Pat. No. 4,419,268 is entitled "Partially Hydrolyzed Silicate Treatment of Catalyst Support" and issued Dec. 6, 1983 to Max P. McDaniel of Phillips Petroleum Company. This reference also relates to an improved chromium catalyst for olefin polymerization. Again, McDaniel refers to the Hill, et al. technique to prepare the aluminum phosphate support which is improved by the incorporation of silica (see column 2, lines 12 et seq.).

(3) U.S. Pat. 4,424,139 entitled "Catalyst Comprising a Phosphate and with a Bis-(Cyclopentadienyl) Chromium-(II) Compound" issued Jan. 3, 1984 to Max P. McDaniel, et al. of Phillips Petroleum Company. This reference relates to phosphate-containing chromium catalyst systems for olefin polymerization. The aluminophosphate catalyst support can be prepared by a number of methods set forth in column 2, line 43, et seq. A conventional technique is referred to by reference to the Hill, et al. '444 patent described above. Reference is also made to the U.S. Pat. No. 3,904,550 to Pine which uses an aluminum alkoxide as discussed above. McDaniel differs a little from Hill, et al. in teaching a pH range of 5 to 10 and passing through the pH range of 4 to 5 quickly (see column 4, lines 36, et seq.).

(4) U.S. Pat. No. 4,504,638 entitled "Ethylene Polymers Made from Phosphate Supported Chromium Catalyst" issued Mar. 12, 1985 to Max P. McDaniel, et al. of Phillips Petroleum Company. This reference again relates to phosphorus supported chromium catalysts for olefin polymerization. Again, McDaniel refers to the Hill, et al. teachings in the '444 patent for how to prepare the aluminophosphates (column 2, lines 46, et seq.). The invention in this case is the use of a trialkylbborane co-catalyst.

(5) An article in the *Journal of Catalysis,* Volume 102, pages 10–20 (1986) entitled "The Structure of Coprecipitated Aluminophosphate Catalysts Supports" by T. T. P. Cheung, et al. is of interest. Cheung, et al. adopt the terminology "aluminophosphate" for the amorphous alumnina-aluminum phosphate precipitates having a phosphorous to aluminum mole ratio of less than 1 and this terminology will be used in this specification, with the understanding the phosphorus to aluminum mole ratio can be substantially 1:1 or less. In preparation of the support, the technique of Hill, et al. is again used except the pH was not held constant (see page 11, left-hand column near the bottom). Cheung, et al., on page 13, left-hand column, do make reference to the use of very concentrated solutions of salts and the rapid addition of ammonia but no particulars are given.

(6) U.S. Pat. No. 5,030,431 entitled "High Pore Volume and Pore Diameter Aluminum Phosphate" issued Jul. 9, 1991 to R. Glemza of W. R. Grace Company. This reference relates to aluminum phosphate compositions characterized by high porosity and a phosphorous to aluminum ratio of approximately 1. The high porosity has a combination of high pore volume and low surface area, resulting in high average pore diameter. Glemza defines high pore volume as "at least 1 cc per gram with a low surface area of 200 to 400 square meters per gram" resulting in average pore diameters of at least 125° Angstrom together with a phosphorous to aluminum mole ratio of 0.8:1 to 1:1 albeit the claims were limited to 0.9:1 to 1:1. The method of preparation was similar to Hill, et al. and others but involved multiple neutralization steps.

(7) European Pat. Application 921104527 (publication number 0 520 346 A2) dated Jun. 20, 1992 relates to an aluminophosphate supported chromium catalyst plus selected co-catalysts. The support has a phosphorous to aluminum mole ratio of close to or equal to 1 and a pore volume of greater than 1 cc per gram. The phosphate supports are known and made by known techniques.

While aluminophosphates have long been known, along with their methods of preparation, such aluminophosphates have not as yet achieved commercial success. Part of the reason for this is believed to be that the prior art aluminophosphates lacked a combination of physical properties which have now been found to characterize superior polymerization catalysts. It is the combination of a high macropore volume of at least 0.1 cc's per gram plus a fragmentation potential (to be defined below) of preferably 30 to 60 plus a preferred meso pore volume of 0.3 to 0.8 cc's per gram which particularly characterize the superior polymerization catalysts. Quite surprisingly the new aluminophosphate made by the new technique of this invention provide this combination of properties in one preferred form of the invention. The combination of high macropore Volume and a fragmentation potential above 30 would be expected to result in an aluminophosphate which is physically unstable. Quite surprisingly, the aluminophosphates of this invention are both physically and thermally stable. While not certain, it is believed to be the presence of sheets of aluminophosphate in the microstructure which results in the packing of the microstructures in such a way that a high macropore volume and a high fragmentation potential are achieved along with physical and thermal stability.

It is an object of this invention to provide a new amorphous aluminophosphate having a macropore volume of at least 0.1 ccs per gram.

It is an object of this invention to provide a new amorphous aluminophosphate having a fragmentation potential above 30.

It is further object of this invention to provide a new amorphous aluminophosphate having, on a microlevel, sheets of aluminophosphate as well as spheres of aluminophosphate.

It is further object of this invention to provide a new method to prepare the new aluminophosphates comprising mixing a first aqueous solution containing aluminum cations or anions and phosphate anions, either acidic or basic, with a second aqueous solution of a neutralizing medium with sufficient shear to result in the formation of a mixture of sheets and spheres of aluminophosphate on a microlevel. The mixing is preferably done in a continuous manner by adding said first and second aqueous solutions to an emulsifier-type mixer-reactor and continuously removing the reaction product from the reactor as such product is formed.

The new aluminophosphates have a wide variety of uses including their use as a support for catalysts. In particular the new aluminophosphates are useful as supports for ethylene polymerization catalysts. Because of their high macropore volume, the new aluminophosphates find use in the treatment of residua and gas oils, but can also be tailored for use as an FCC catalyst or for use in hydroprocessing such as hydrodenitrofication, hydrodesulfurization, hydrocracking or hydrogenation.

SUMMARY OF THE INVENTION

In accordance with the invention, a new class of aluminophosphates wherein the phosphorous to aluminum mole ratio is about 1:1 or less have now been discovered. These aluminophosphates are amorphous and, have, in their microstructure, sheets of aluminophosphate as well as spheres of aluminophosphate. In one embodiment, the aluminophosphates have a macropore volume greater than 0.1 cc's per gram. In another embodiment, the aluminophosphates have a fragmentation potential of greater than 30.

The above new class of thermally and physically stable aluminophosphates are prepared, in one preferred embodiment, by: forming a first aqueous solution of aluminum cations and $PO_4$ anions wherein the mole ratio of phosphorus to the aluminum cations is about 1:1 or less; neutralizing said first aqueous solution by the addition of a second aqueous solution of an ammonia based material selected from the group consisting of ammonium hydroxide, ammonium carbonate, ammonium bicarbonate or urea under mixing conditions with shear sufficient to produce an aluminophosphate precipitate having, in the microstructure, both sheets and spheres of said aluminophosphate. The aluminophosphate precipitate is removed from the neutralization or reaction zone substantially as quickly as it is formed.

The recovered precipitate is continuously washed on a vibrating filtration membrane until the conductivity of the effluent is reduced to a value less than the starting conductivity but greatest than about 500 mmohs. Preferably the water temperature during said washing is controlled at a temperature of from ambient to 80° C. After washing, the solids content on the vibrating filtration membrane is increased to about 12 to 22% after which the solids are dried and thereafter calcined at a temperature of from 300 to 800° C. for from 1 to 16 hours. While any calcining technique can be used, a fluid bed type calcining is preferred.

The Figures in this specification are as follows:

FIG. 1—Side view of Mixer-Reactor

FIG. 2—Top view of Mixer-Reactor

FIG. 3—TEM Photomicrograph of Example 1 aluminophosphate

FIG. 4—TEM Photomicrograph of Example 4 aluminophosphate

FIG. 5—TEM Photomicrograph of Example 8 aluminophosphate by microtomy

FIG. 6—TEM Photomicrograph of Example 4 aluminophosphate by crusthing

FIG. 7—TEM Photomicrograph of Example 12

The Tables in this specification are as follows:

Table 1—Characteristics of calcined aluminophosphates
Table 2—Variables in preparation of aluminophosphates
Table 3—Polymerization of Ethylene
Table 4—Variations of shear and concentration

DETAILED DESCRIPTION OF THE INVENTION.

Figure 1:
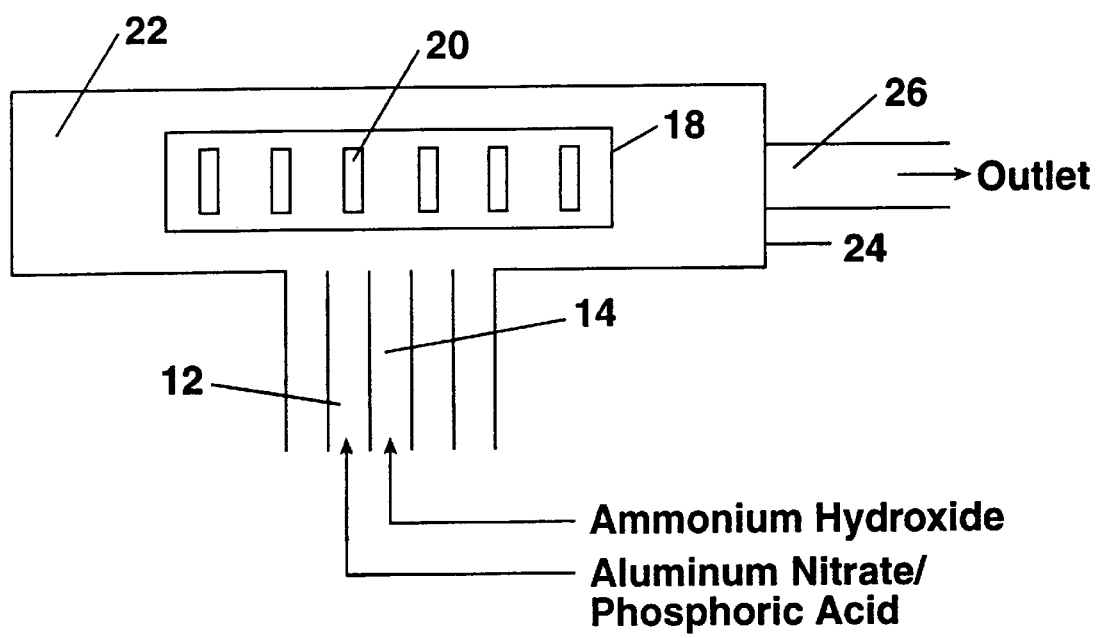

Chemically pure aluminophosphate hydrogels and precipitates are very closely related, having the empirical formula $Al_2O_3 \cdot xAlPO_4$. It is also known that physical properties such as surface area and pore size and pore size distribution can differ significantly not only between aluminophosphate hydrogels and precipitates but even between various types of precipitates depending on the treatment of the precipitates both during and after preparation i.e. hot washing; hot aging, etc.

Certain aluminophosphate precipitates have now been discovered which have excellent thermal and physical stability, together with a relatively high amount of macroporosity so that these materials are particularly suited for use as catalyst support materials, especially for use in reactions involving relatively large molecules (e.g., residua) in order to allow the molecules easy ingress and egress.

The aluminophosphate precipitates wherein the phosphorus to aluminum mole ratio is about 1:1 or less are new compositions of matter. These new compositions of matter are characterized by being amorphous; and having, in their microstructure, sheets of aluminophosphate as well as spheres of aluminophosphate.

The new aluminophosphates have, in addition, certain characteristics in their preferred form as set forth below. These characteristics were determined after drying and calcining the aluminophosphates at 300° C. for 8 hours.

(1) Surface Area by the BET Method

Typically the surface area of the new aluminophosphates is from about 90 to about 300 $m^2/gm$, more typically from 90 to 110 $m^2/gm$.

(2) Mesopore Volume by the BET Method

By "mesopore volume" in this specification is meant the volume occupied by pore sizes from 20 to 100 Å. The mesopore volume is usually from 0.2 to 1 cc's per gram preferably from 0.3 to 0.8 cc's per gram; more preferably from 0.5 to 0.7 cc's per gram. There are substantially no micropores (less than 20 Å) in these new materials.

(3) Macropore Volume by the Mercury Technique

By "macropore volume" in this specification is meant the volume occupied by pore sizes in excess of 1000 Å. It is particularly desirable for some end uses such as the polymerization of olefins to have a macropore volume in excess of 0.1 cc's per gram. The problem in the past was obtaining supports with a high macropore volume in excess of 0.1 cc's per gram along with physical stability. The aluminophosphates of this invention in one of their preferred forms have a high macropore volume and are physically stable as shown by the fact they were successfully used in a fluid bed gas phase polymerization of ethylene.

The macropore volume is taken by the mercury porosimetry test (by ASTM Designation: D4284-88 where gamma is taken to be 473 dynes per cm and the contact angle is taken to be 140 degrees.)

The macropore volumes of the new aluminophosphates can vary from 0.02 to 0.85 cc's per gram but preferably are 0.1 to 0.75 cc's per gram, more preferably from 0.15 to 0.4 cc's per gram.

Higher macropore volume materials within the range set forth above were prepared by directly calcining the undried aluminophosphate filter cake at 300° C. for 8 hours in a muffle furnace. The usual spray drying followed by calcining at 300° C. for 8 hours yielded aluminophosphates with macropore volumes from about 0.03 to about 0.55 cc's per gram.

(4) Mean Mesopore Diameter by BET Method

The mean mesopore diameter of the new aluminophosphates can be from 50 to 450 Å; typically is from 150 to 400 Å and most typically is from 260 to 300 Å.

(5) Fragmentation Potential and Sonication Number

The testing of catalysts so as to determine attrition characteristics is recognized in the art. These tests typically involve introduction of catalyst particles into a vessel and subsequent agitation of the particles. In such an arrangement, attrition results primarily from abrasion caused by particles impacting with each other as well as with the wall of the vessel.

For example, in processes where particles are subjected to fluidized bed conditions, fluidized tests such as air-jet testing are common in as far as they can be considered directly relevant to the performance of particles under such conditions.

While such tests can be effective in testing attrition under certain conditions, they have largely proven ineffective with respect to predicting the effectiveness of catalysts in processes where the attrition is related to the fractionation of the catalyst.

Moreover, such techniques fail to accurately report that polymerization catalysts, unlike catalysts employed in other processes, e.g., catalytic cracking, are subject to attrition at two different stages, i.e., activation and polymerization. Thus, while traditional techniques, e.g., air-jet testing, may provide an effective model for attrition occurring during activation, such techniques are not an effective model for attrition occurring during polymerization and thus are not sufficient to deal with such catalysts.

One particular process in which fractionation of the catalyst occurs is the polymerization of olefins. Olefin polymerization processes are well recognized in the art. Typical examples of such processes include slurry batch, e.g., slurry loop and gas phase olefin polymerization processes.

Although each of these processes utilize catalysts in the production of polyolefines such as polyethylene, they differ significantly with respect to the dynamics of particle growth therein. For example, gas phase processes include as much as 85% ethylene while slurry loop type processes have a much lower ethylene solubility, e.g., typically 8% maximum. Accordingly, catalysts which may be effective in one olefin polymerization process may not be found effective in another process. Surprisingly, the new aluminophosphate supported polymer catalysts of this invention are effective in both batch and gas phase polymerization processes. One aspect of the present invention is based upon the surprising discovery that the "fragmentation potential" of catalysts, such as olefin polymerization catalysts, as determined by sonication, can be used in determining the expected efficiency of a catalyst in a process where fragmentation will occur.

The sonication process for use in the present invention can effectively be employed within any sonication environment with sonication baths and in particular, sonication baths employing water, being preferred.

This sonication test can then typically take on one of two forms. Either the material can be sonicated for a predetermined period of time, e.g., 30 minutes, and the increase in fines, e.g., percent increase, subsequent to sonication can be determined. This test directly provides what is called the "fragmentation potential".

Alternatively, the material can be sonicated for a period of time sufficient to reach a preselected mean particle size. The result of this particular test is called the "Sonication Number". Although this specification will typically make reference to the fragmentation potential, the concepts and advantages are the same for both of these basic tests.

In fact, as is readily apparent, these tests are basically analogous with the numerical results being inversely related. That is, a catalyst which has a small increase in fine production over a predetermined period of time will typically require a longer time to reach the preselected mean particle size. The inverse is also true, a catalyst having large percent increase in fine production will have a smaller relative period of time to reach the predetermined mean particle size.

The particular sonication test employed is not critical to the present invention and the selection of test and equipment is largely determined by practical considerations such as time allotted to perform the test.

For purposes of this specification, the "fragmentation potential" is defined as the percent increase in the percentage of particles which are smaller than 40 microns after sonication for 30 minutes in an aqueous medium plus a dispersant using an Horiba LA 900 instrument. Calculation of the fragmentation potential, of course, involves taking the percent of particles which are smaller than 40 microns after 30 minutes and subtracting the percent of particles smaller than 40 microns in the sample before sonication. It was recognized that the initial sample could have some spheres of less than 40 microns agglomerated with somewhat larger spheres. A preferred variation is to initially degglomerate the sample by sonicating the sample for one minute to obtain a base value for the percent of particles smaller than 40 microns before sonicating for 30 minutes as described herein. In this instance, the fragmentation potential is calculated by taking the percent of particles smaller than 40 microns after 30 minutes and subtracting the percent of particles smaller than 40 microns in the sample after an initial one minute sonication. The fragmentation potential using the preferred technique is lower, as expected. In the data to be given below, the fragmentation potential is given as (30–0) or (30–1), the "0" indicating no pre-sonication, and the "1" indicating a pre-sonication of one minute. In an analogous test, the sonication number is determined as the time for the mean particle size of a test sample to fall to 40 microns.

Preferably the fragmentation potential is from 10 to 87 percent, more preferably above 30 percent and most preferably from 30 to 60 percent.

Similarly, the Sonication Number is preferably from 5 to 200 minutes; more preferably from 10 to 150 minutes; and most preferably from 20 to 100 minutes. These numbers when using a Malvern Particle Size Analyzer with 300 mm focal length and an active beam length of 2 mm.

The fragmentation potential and sonication numbers set forth above are for the new aluminophosphates of this invention after calcining at 300° C. for 8 hours. The fragmentation potential and sonication number will, of course, vary depending on whether the catalyst base is tested before or after calcining; before or after the addition of chromia, etc. Likewise, the optimal fragmentation potential will differ from other bases such as silica.

While not wishing to be bound by any theory, it is believed the sonication technique is a unique tool for providing a fingerprint of an improved ethylene polymerization catalyst because of the shattering of the particles as shockwaves move through the internal pore structure. Accordingly, it is believed that such a process closely resembles the fracturing process which can occur during polymerization, i.e., the catalyst particle breakup due to the accumulation of polymer and pressure within the pore structure.

(6) Thermal Stability

Thermal stability is defined as less than a thirty percent loss of surface area after heating at 600° C. for 2 hours versus heating for 8 hours at 300° C. The loss of surface area of the preferred aluminophosphate made by the method of this invention (see Example 8 below) was 18% i.e. 93 $m^2/gm$ after calcining at 300° C. for 8 hours and 76 $m^2/gm$ after calcining at 600° C. for 2 hours (7) Microscopy The new aluminophosphate compositions of this invention possess a very unique and important characteristic over the aluminophosphates of the prior art i.e. the new aluminophosphates have a microstructure of sheets of aluminophosphate as well as spheres of aluminophosphate.

Physically, the new aluminophosphates are spray dried to form spherical particles roughly 0.01 cm (100 microns) in diameter. The microscopic examinations of these particles is done using standard transmission electron microscope (TEM) techniques. For example, observe the TEM specimen in the bright field imaging mode. For the purpose of this specification, it is necessary to prepare the TEM specimen by the microtomy technique.

The microtomy technique is a well established specimen preparation technique in the field of transmission electron microscopy. Its description can be found in standard reference published literature, for example, T. F. Malis and D. Steele, "Ultramicrotomy for Materials Science," in "Workshop on specimen preparation for TEM of materials II," ed. R. Anderson, vol. 199, Materials Research Symposium Proceedings (MRS, Pittsburgh, 1990) and N. Reid, "Ultramicrotomy," in the "Practical methods in electron microscopy" series, ed. A. M. Glauert, publ. Elsevier/North Holland, 1975. Briefly, it involves embedding the sample in a resin, form a pellet by polymerizing the resin in a mold, then cut thin sections using a microtone equipped with a diamond knife. In the work for this specification, the resin used was L. R. White resin. The typical thin section would have a thickness of about 0.06 microns. Care needs to be taken to embed whole aluminophosphate particles in order that views of the entire random cross sections of the aluminophosphate particles are presented. Furthermore, it is important that prudent sampling techniques be used to collect the sample to be used for the TEM specimen preparation step. The portion of aluminophosphate particles that were embedded should be selected from a sample by sequentially dividing the originally collected sample into quarter portions until the desired amount of material suitable for the embedding process is reached.

In the TEM examination of specimens, it is always a balance between the amount of details to be observed and the amount of material to be examined to ensure representativeness. To observe the increasing details of relevant microscopic features requires higher magnifications while this decreases the field of view and the amount of material examined. However, a modern microscope allows the operator to easily change magnifications from 100× to 1000000×. It is standard practice to survey the sample at low magnifications, identify and confirm the views that are typical and representative of the sample, then increase the magnification as necessary to examine the details. Images will then be recorded to illustrate the characteristics of the sample. The recorded images (which usually are on a 3.25"×4" negative) are then printed and usually further magnified. Such further magnification occurs by printing, for example, to an 8.5×11" print.

For the purposes of this specification, the printed images of photomicrographs having a destination magnification of 12000×±1200× is suitable. The term "destination magnification" is used to embrace the sum of the magnification on the negative image and the magnification that occurs when the negative is further magnified when printed to larger size. This destination magnification takes into account some newer machines which use cameras to produce a digital image onto a computer for possible printing at a later time.

Figure 2:
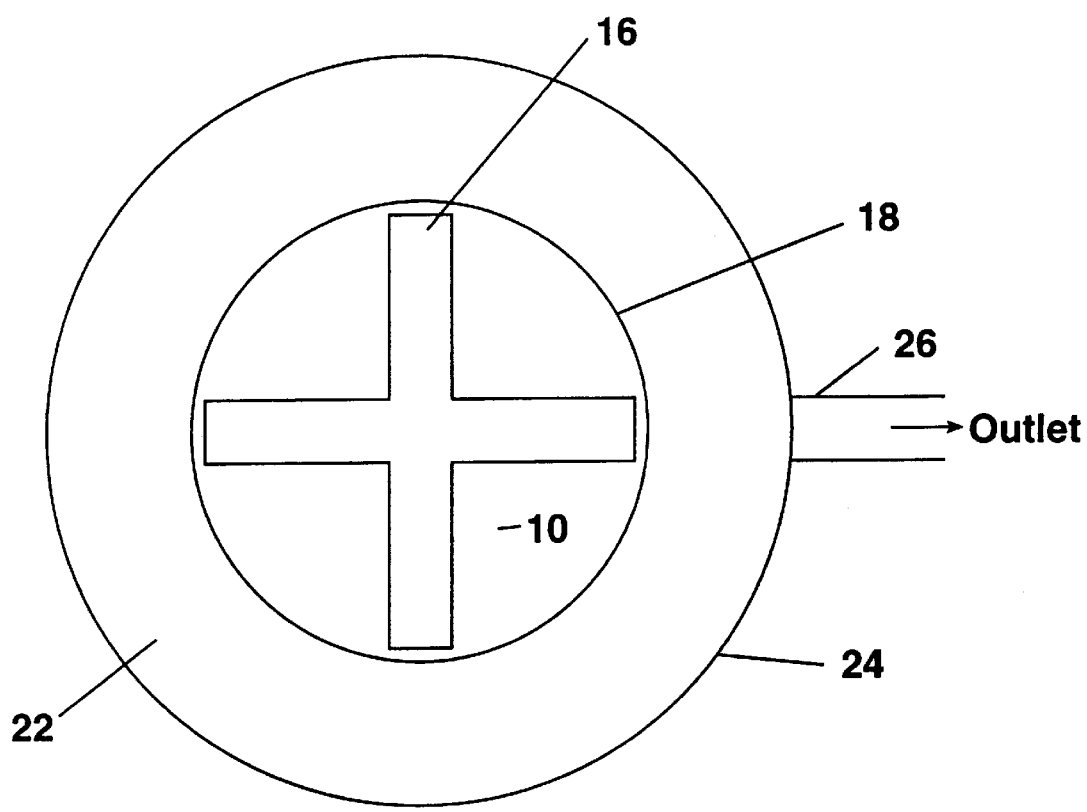
Figure 3:
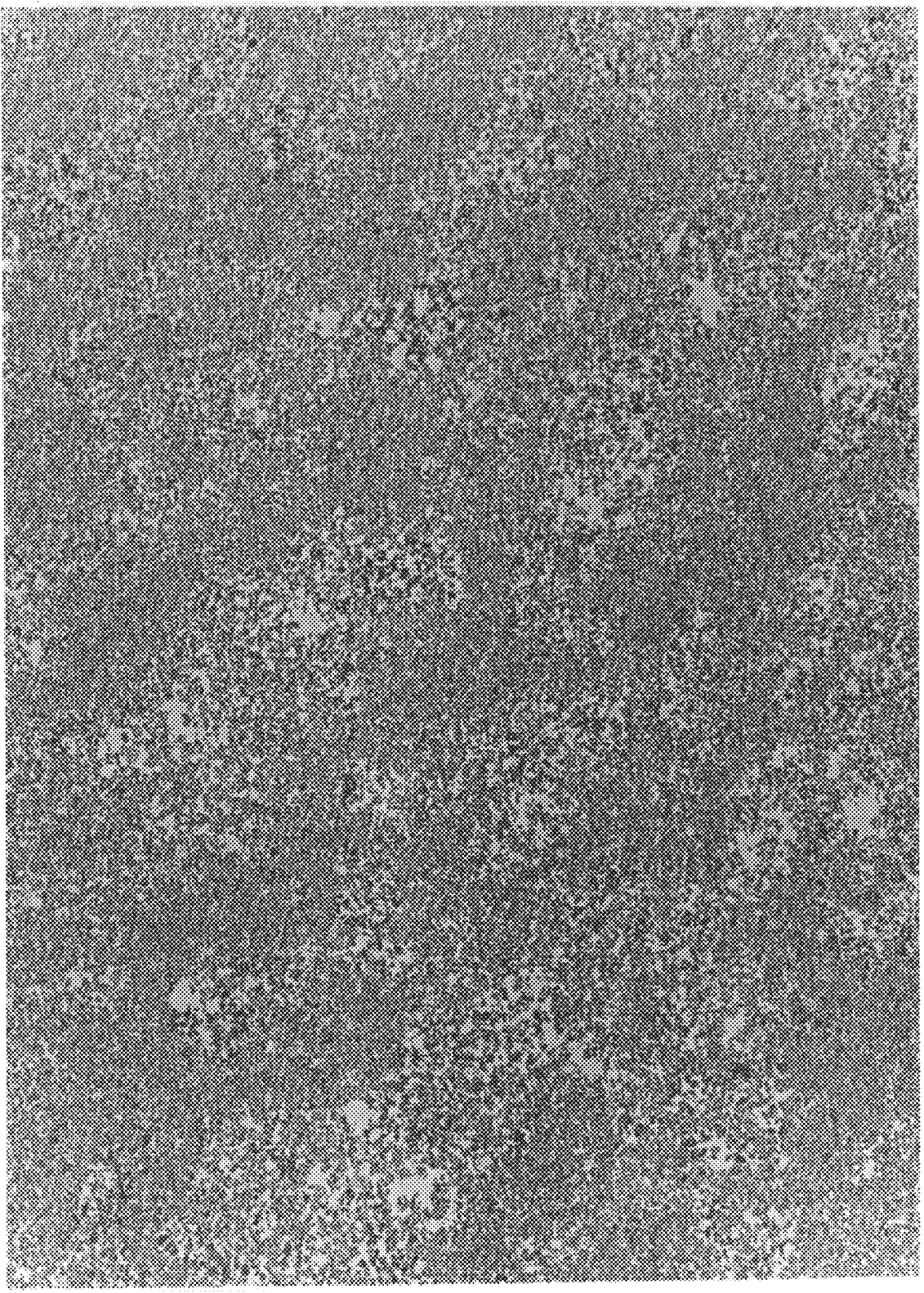

FIG. 3 is a photomicrograph of an aluminophosphate made by the technique of the prior art (Example 1 below). FIG. 3 shows only spheres of aluminophosphate. This confirms the presence of spheres as shown by FIGS. 1 and 2 of U.S. Pat. No. 4,219,444 of Hill et al or FIGS. 1–9 of U.S. Pat. No. 4,080,311 to Kehl.

Figure 4:
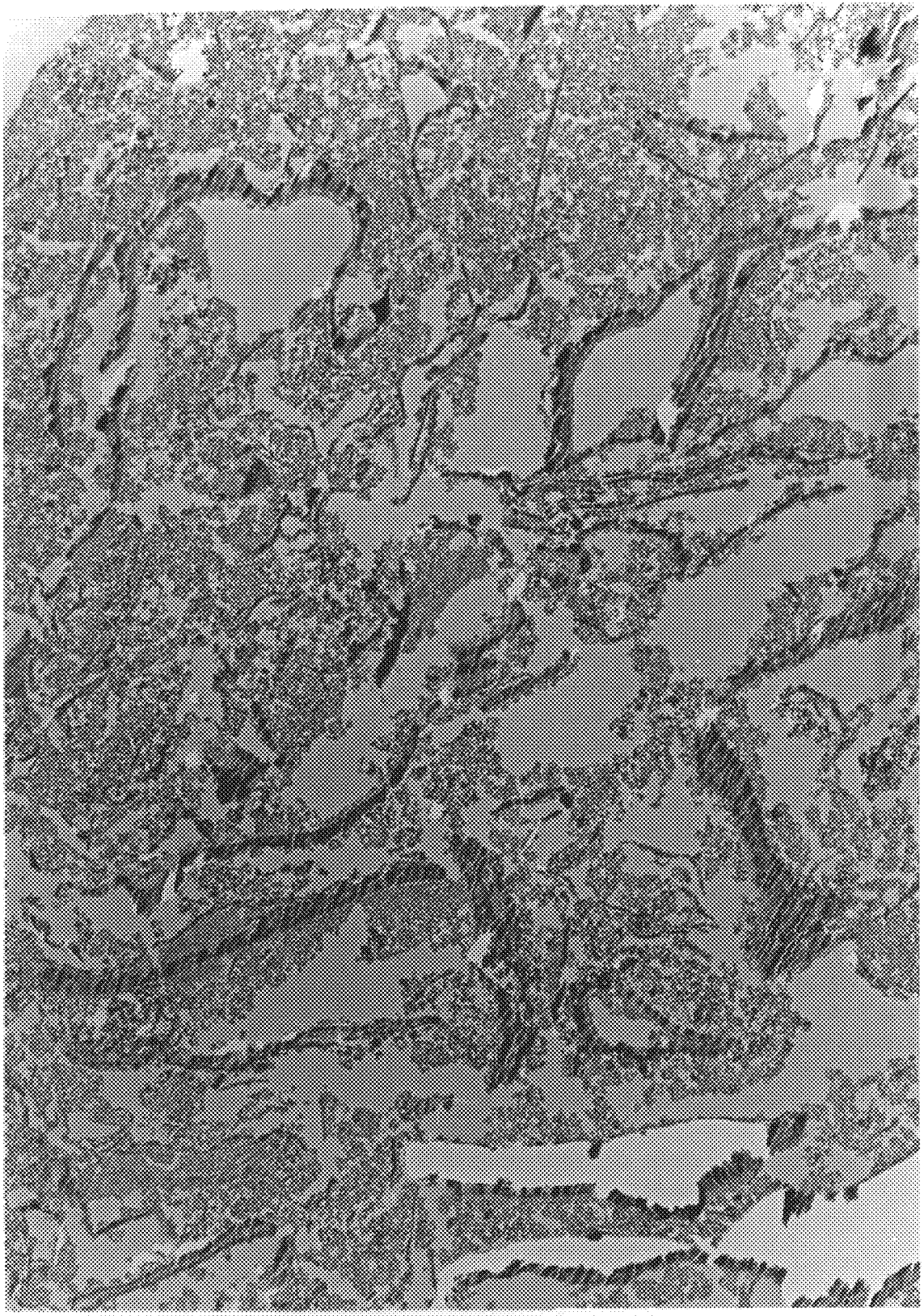

FIG. 4 is a photomicrograph of one of the aluminophosphates of this invention as prepared by Example 4 below. Referring to FIG. 4, it can be seen that in addition to round particles, there are line features of various thickness. It is obvious that the cross section of spheres by a plane as well as the projection of spheres onto a plane will both result in round features. In this case, the round particles tend to be smaller than the thickness of the microtome sections. Hence, the round particles are viewed in projection in the images. It is also well known in elemental analytical geometry that the intersection between any extended surface and a plane is a line. The line is a straight line if both surfaces are planer. The line features seen in FIG. 4 are thus sheets that are present in the samples. This interpretation is further confirmed by examining another TEM specimen of the sample shown in FIG. 4 prepared by crushing the sample instead of by microtomy. This specimen preparation method breaks apart the whole aluminophosphate particles into small fragments then scatters the fragments onto thin electron transparent supports. The image (FIG. 6) clearly demonstrates the presence of sheets.

An image analysis technique has been developed to quantify the amount of sheets per unit volume in a given sample. This is based on the important general mathematical expressions that relate the features of the microstructure (interfaces, lines, and points) and intersections with an arbitrary test line. The equations are set forth in C. S. Smith and L. Guttman, "Measurement of internal boundaries in three dimensional structures by random sectioning," Trans. AIME, vol. 197, p 81, (1953). The relevant expression for this specification is:

$$S_v = 2N_L \quad (1)$$

or more generally $S_v$ is proportional to $N_L$ which can be written as $$S_v = \text{constant} \times N_L \quad (2)$$

where $S_v$=interface area per unit volume, in units of mm$^2$/mm$^3$ or micron$^2$/micron$^3$ and $N_L$=average number of intersections per unit length between a random test line, and the traces of the extended surface in the image units of mm$^{-1}$ or micron$^{-1}$.

The field of study for this type of analysis is called stereology. It is the study of three dimensional structures as revealed in two dimensional images. Explanations and example applications of stereological analysis to the characterization of microstructures can be found in the text books by R. T. DeHoff and F. N. Rhines, "Quantitative Microscopy," publ. TechBooks/McGraw Hill, 1968. and J. C. Russ, "Computer-Assisted Microscopy," Plenum Press, 1990. DeHoff and Rhines derived formula (1) above which defines the "constant" as "2" for one interface. In the case of sheets being disposed among spheres, there are two interfaces, one on each side of the sheet and thus the "constant" for formula (2) above is 2×2 or 4.

Hence, the samples in this invention can be specified by the parameter $S_v$. In practice, as evident in equations (1) and (2), one only needs to determine $N_L$. An example procedure is:

1. Select at least five representative printed images of 8.5 in.×11 in. size at 12000× destination magnification.
2. Overlay a set of test lines drawn on a transparent sheet of paper on the image. The orientation of these lines must be random with respect to the line features resulting from the sheets. The total length of these lines on the transparency should be at least 150 cm.
3. Measure and record the number of intersections between the test lines and the lines on the image then divide it by the total length of the test lines.
4. The numerical results for $N_L$ should be presented in micron$^{-1}$. Hence, care must be taken to convert the distances measured on the photomicrographs into correct units of length. That is, properly include the effect of the image magnification. The new aluminophosphate compositions of this invention are unique in having a phosphorus to aluminum mole ratio of less than 1; being amorphous, and having, on a microlevel shown by TEM at about 12000× magnification to have sheets as well as spheres of aluminophosphate. It has been verified by energy dispersive analysis at high spatial resolution in the transmission electron microscope that the chemical composition of the sheets is indistinguishable from the chemical composition of the spheres. While it is believed that the presence of any quantity of sheets is the unique feature of the new aluminophosphates of this invention, it is preferred that the aluminophosphates have an $N_L$ from 0.1 to 3 micron$^{-1}$; more preferably from 0.15 to 1.5 micron$^{-1}$; and most preferably from 0.3 to 1 micron$^{-1}$.

METHOD OF PREPARATION

As noted above, Hill, et al. and other references teach that the conventional method of making aluminophosphate precipitates is to neutralize in a batch stirred reactor an acidic medium containing aluminum cations and phosphate anions. The aluminophosphate is typically retained in the batch stirred reactor as fresh reactants are added until all of the reactants are exhausted for that batch. When these conventional techniques are employed, the resulting aluminophosphate contains, on a microlevel, only spheres of aluminophosphate as shown in FIG. 3 (see also FIGS. 1 and 2 of Hill, et al. U.S. Pat. No. 4,219,4444 and FIGS. 1 through 8 of Kehl, et al., U.S. Pat. No. 4,080,311 which are incorporated herein by reference.)

In accordance with the invention, a method of preparing an amorphous aluminophosphate having a phosphorus to aluminum mole ratio of about 1:1 or less comprises:

(a) forming a first aqueous solution of aluminum and phosphorus ions wherein the mole ratio of the phosphorus ions to the aluminum ions is about 1:1 or less;

(b) forming a second aqueous solution to neutralize said first aqueous solution;

(c) contacting said first and second aqueous solutions under mixing conditions with sufficient shear to produce an aluminophosphate precipitate having in its microstructure both sheets and spheres of aluminophosphate.

This technique is quite simple and involves, in one embodiment, the simultaneous addition of a solution of an aluminum cations and phosphate anions and a base such as an aqueous solution of an ammonia based material selected from the group consisting of ammonium hydroxide, ammonium carbonate, ammonium bicarbonate, or urea to a high mix, high shear reactor sometimes known as an emulsifier. Kehl, in U.S. Pat. No. 4,080,311, teaches vigorous mixing as do others but the key to producing an aluminophosphate composition which contains, on a microlevel, both sheets and spheres of aluminophosphate is the use of vigorous mixing with shear. The neutralization reaction is exothermic and the increase in temperature is reflected by the rate of addition of the aqueous solution of the aluminum cations and phosphorous anions and the rate of the addition of the base to the mixer-reactor. It is preferred that the concentration of the salts and the base be high so that on mixing of the two streams a precipitate is immediately formed. The precipitate is removed from the high shear reactor substantially as quickly as it is formed.

In addition, as noted above, the preparation of aluminophosphates having a fragmentation potential of over 30 was desirable for use of the aluminophosphate as a polymerization catalyst support. The aluminophosphates prepared by the technique of Example 1 below i.e. the prior art, resulted in aluminophosphates having a fragmentation potential of less than 30. Using the above described continuous technique with vigorous mixing with shear, aluminophosphates having fragmentation potentials of over 30 (and indeed over 50) were achieved so long as the shear was sufficient and the concentration of reactants high (see examples 16 et. seq. below).

It is of interest that the initial aluminophosphates produced by the continuous mixing with shear technique were so hard that the fragmentation potential was 19 (see example 16 below). While these hard aluminophosphates may find use in other areas, one primary goal was to discover an aluminophosphate having a fragmentation potential of over 30 for use as a support for a polymerization catalyst. Surprisingly, as the shear during mixing increased along with the concentration of reactants, the resulting aluminophosphates had fragmentation potentials of 30 and above which were well beyond fragmentation potentials of aluminophosphates produced using the prior art technique of Hill et al or Kehl. Initially it was believed these new aluminophosphates having fragmentation potentials of 30 and above would be too soft to be useful as a catalyst base. Surprisingly the new aluminophosphates were physically stable. While not desiring to be held to any theory, it is believed the presence of sheets of aluminophosphate in the microstructure results in a different packing of the microstructures which gives rise to the unusual properties of these new aluminophosphates.

In preparing the new compositions of this invention, a first aqueous solution of aluminum cations is formed, in one preferred embodiment, by dissolving any suitable inorganic aluminum salt in water. Suitable aluminum salts include: aluminum chloride, aluminum nitrate and aluminum sulfate. In essence, any aluminum salt which is soluble in water can be employed and the particular type of aluminum salt is not critical. The concentration of aluminum salt to employ is not critical but is preferred to be somewhat concentrated for ease of handling in the emulsifier mixer.

The concentration of aluminum salt can suitably be from 12 to 80 weight percent or more of the first aqueous solution; more suitably from 30 to 70 weight percent; and preferably from 60 to 70 weight percent. As noted above, the use of the lower concentration of salts resulted in the formation of harder aluminophosphate precipitates or hydrogels (these terms are used interchangeably in this specification). It is preferred to use a high enough concentration of aluminum salt so that on neutralization a precipitate is immediately formed.

The aqueous solution of aluminum cations is acidified with phosphoric acid which also provides the source of phosphate anions. The amount of phosphoric acid to employ is such that the phosphorous to aluminum mole ratio in the acidified solution is close to the aluminum to phosphorous mole ratio desired in the final product. The pH of the acidified solution containing the aluminum cations and phosphorous anions is usually about 1. The concentration of phosphate anions is such that the phosphorous to aluminum mole ratio is approximately 1:1 or less. A mole ratio of phosphorous to aluminum in this first aqueous solution can be about 1:1 or a little higher and still have the resulting aluminophosphate mole have a ratio of about 1:1 or less and be amorphous.

The phosphorus to aluminum mole ratio for the aluminophosphate product is less than, or equal to one. The phosphorus to aluminum mole ratio, preferably, is from 0.2:1 to about 1:1; more preferably, the ratio is from 0.4:1 to about 0.8:1; and most preferably, from 0.4:1 to 0.6:1.

The above first aqueous solution is neutralized in a mixer operated with shear forces. Neutralization can occur using a second aqueous solution having a pH above about 8 such as an ammonia based material selected from the group consisting of ammonium hydroxide, ammonium carbonate, ammonium bicarbonate or urea. The manner of neutralization is controlled in the mixer so the pH of the combined first aqueous solution and the neutralizing base medium is in the range of about 4 to 11, more typically 6 to 11, preferably 7 to 10. This is normally done by adding controlled amounts of (i) acidified aqueous solution of aluminum cations and phosphate anions and (ii) a neutralizing medium as described directly to a shear mixer in a continuous manner.

Alternatively, the first aqueous solution can be a basic solution of salts such as a mixture of sodium aluminate ($Na_2O.Al_2O_3.3H_2O$) and sodium phosphate ($Na_3PO_4.12H_2O$) which is neutralized with an aqueous acid solution with a pH less than 6 such as HCl. The concentration of salts are within the ranges set forth above for the aluminum cations/phosphoric acid and are easily determined by those with ordinary skill in the art. Similarly, the amount of acid e.g. HCL to use and the concentration should be sufficient to result in neutralization with the formation of an aluminophosphate precipitate. The range of pH to employ is as set forth above.

The neutralization reaction is substantially instantaneous and is exothermic. In the prior art methods of preparing aluminophosphate precipitates, large excesses of water were present which served as a heat sink. The prior art methods were really stirred batch techniques where the reaction products remained in contact with fresh reactants until the reaction was complete. The method of this invention involves the continuous addition of the two aqueous solutions to a high shear mixer/reactor, and the continuous removal of the aluminophosphate reaction product substantially as quickly as it is formed. The reaction product can be quenched and/or cooling means can be used to lower the mixer/reactor temperature. The usual temperature in the mixer/reactor is from 20° C. to 90° C.

The key element in the preparation of the new aluminophosphate compositions of this invention is mixing the acid-base reactants with shear. Sufficient shear forces need to be generated to result in the formation of sheets of aluminophosphate as well as spheres in the microstructure of the precipitate.

There are, of course, various types of mixing techniques and apparatus which generate varying levels of shear delivery mixing. See for example, "Scaleup and Design of Industrial Mixing Processes" by Gary B. Tatterson, McGraw-Hill, Inc, (1994) and especially FIG. 2.9 which illustrates the shear level of various types of mixers and impellers. Referring to FIG. 2.9 of Tatterson, which is incorporated herein by reference, the colloid mills, saw blade type impellers; homogenizers and stator rotor mixers provide the highest level of shear while the hydrofoil and propeller provide the lowest shear. The newer jet stream mixers can also be employed with sufficient shear as taught herein.

Shear in this specification means shear rate which is a change in velocity ($\Delta V$) divided by a change in distance ($\Delta d$). For example, in a rotor stator mixer, the fluids to be mixed usually are pumped into the rotor stator chamber through concentric tubes. The rotor stator chamber consists of a rotor revolving at some desired rate and a "stator" or surrounding wall close to the tips of the revolving rotor. The wall is provided with openings to permit the mixed fluids to be removed or withdrawn quickly and continuously from the rotor-stator chamber.

Using the rotor stator mixer as an example, the velocity of the fluid is highest at the tip of the rotor impeller and is zero at the wall. Thus, the $\Delta V$ is taken as the velocity at the tip which can be calculated by multiplying the revolutions of the rotor per second times the radius of the rotor i.e.

$$\Delta V = ND/2$$

where N=revolution of the rotor per second; D=diameter of rotor.

The "change in distance", $\Delta d$, is equivalent to the distance over which one measures the change in velocity, for example, the distance between the tip of the impeller and the wall or W in a rotor stator.

Shear rates thus have the units of reciprocal time.

Obviously the shape of the impeller and the design of the stator have an effect on the amount of shear developed. The stator for example can be a cylindrical wall provided with slots or can be a cylindrical screen.

For purposes of this specification, the apparent average shear rate is defined as the change in velocity over the change in distance and is calculated by the equation:

$$\frac{\text{Apparent Average}}{\text{Shear Rate}} = \frac{\pi ND}{W}$$

$$\pi = pi = 3.1416$$

where

N is the revolutions of the impeller per second;

W is the distance between the tip of the impeller and the wall of the mixer; and D is the diameter of the rotor (in the case of rotor-stator mixer) or can be the thickness of the impeller blade for other mixers.

It will be obvious to those with ordinary skill in the art that shear rates can be increased by increasing $\Delta V$ or decreasing $\Delta d$. Just how a high shear rate is effected is not critical so long as sufficient shear is present during mixing to result in the formation of sheets as well as spheres in the microstructure of the aluminophosphate.

The reaction to form the aluminophosphate is an acid-base reaction which occurs rapidly and exothermically. Using a rotor stator high shear continuous mixing device, the reactants are fed into the rotor stator mixer and the aluminophosphate hydrogel removed in times usually from 0.5 to 5 seconds. Most typically the reactions and mixing occurs in less than one second.

As noted above, it is typical and preferred to use more concentrated solutions of aluminum and phosphorus so that on neutralization a precipitate is formed immediately. It has been found that the apparent average shear rate should be at least $0.5 \times 10^4$ reciprocal seconds to result in the formation of sheets of aluminophosphate in the microstructure. The typical shear rates are from $1 \times 10^4$ sec$^{-1}$ to $10 \times 10^4$ sec$^{-1}$; but higher shear rates can be used, if desired.

With the above teachings, one with ordinary skill in the art can with little experimentation discover the appropriate mixing device and shear rate to employ to generate sheets as well as spheres in the microstructure of aluminophosphates made in accordance with this invention.

The product from the high shear mixer can be quenched if desired and is then washed, preferably on a vibrating filtration membrane with continuous washing to reduce the concentration of residual salts (i.e. reaction product such as nitrates or chlorides).

Typically, the initial conductivity of the water wash is from 30,000 to 100,000 mmohs. Washing is conducted to reduce the conductivity from the initial value to some lower value, typically from 2,000 to 4,000 mmohs. A reduction in conductivity indicates, of course, a reduction in residual salts. Residual salt reduction is generally desired because such salts may act as poisons to catalytic metal deposited on the support. However, it has been discovered that some residual salt level is required, apparently, to maintain the stability of the aluminophosphate structure. For example, as will be shown in Example 28 below, washing to a conductivity level of 53 mmohs resulted in a phase separation of the product on calcination. In addition, the desired sheets of aluminophosphate were not present in the microstructure. Washing to conductivity level of 500 mmohs (Examples 13 and 14 below) resulted in no phase separation of the product on calcination and sheets of aluminophosphate were present in the microstructure. While not wishing to bound by any theory, it appears that some residual salt content is required to stabilize the aluminophosphate structure and, indeed, preserve the sheets of aluminophosphate in the microstructure.

The determination of whether or not to employ a quench procedure to reduce the temperature of the aluminophosphate precipitate is a function of the desired size of the pores in the final product. Quenching to a temperature of from 18 to 30 C. tends to make an aluminophosphate product having a more narrow distribution of pores whereas non-quenching of the product tends to broaden the pore size distribution in the product.

It should be noted that the microstructure of the aluminophosphate precipitate is believed to be fairly set during the initial shear mixing of the reactants. The distribution of pore size and pore volume can be affected by the use or non-use of a quench and whether washing is done with either hot water or cold water. The use of increased temperatures and hot aging tends to shift the product to a larger pore volume and a larger macropore volume. By hot aging it is meant that the product simply sits in a hold vessel for from 1 to 4 hours at a temperature from 50 to 80° C. By hot washing is meant that the product is washed with water which has been heated to a temperature of 50 to 70 or 80° C.

The preferred technique of washing and filtration is by the use of a vibrating filtration membrane. When a vibrating filtration membrane is employed the aluminophosphate is not compacted as a cake so that washing and filtration occur much more quickly than with prior art non-vibrating techniques. After the water has been reduced to the desired conductivity level, the water washing is stopped and the solids are concentrated on the filtration membrane to a level of perhaps 12 to 22% solids, depending on which type of drying is thereafter employed. The temperature of drying is usually from 100 to 130° C. for times varying from 6 to 30 hours. Spray drying, of course, is very rapid and results in the formation of small-particle size beads which are suitable for use in fluid bed type operations.

After drying the precipitates are calcined by heating in an elevated temperature. Usually the heating is done in an atmosphere containing oxygen (e.g. air) at a temperature from about 300° C. to 800° C. for a time of up to 16 hours, usually a time from 2 to 16 hours.

In addition to the properties set forth above, the particle density in grams per cc for the aluminophosphates of this invention is generally from 0.6 to 0.75. The skeletal density in grams per cc is generally from about 2.3 to 2.5. The total pore volume by the mercury porosimetry technique is usually from 0.5 to 2 cc's per gram; more usually from 0.6 to 1.3 cc's per gram; and most usually from 0.8 to 1.1 cc's per gram. The invention will be described with reference to the following Experimental Work.

EXPERIMENTAL WORK

A. A series of aluminophosphates was prepared by the prior art technique.

EXAMPLE 1

Batch Preparation of Aluminophosphate by Prior Art Technique

In the run for this Example, 101.3 pounds of DI water were added to a 35 gallon mixing tank. With mixing (an air driven marine impeller mixer), 6.6 pounds of Al $(NO_3)_3$ ° $9H_2O$ (assay 97%) were added to the water. Mixing was continued until the solids dissolved. The pH of this first solution was 2.8.

To the first solution was added 992.5 grams of phosphoric acid (assay 85.6% $H_3PO_4$) to form a second solution with a pH of about 1.0.

A separate solution of ammonium hydroxide (assay 28–30% $NH_3$) was prepared.

About 13 liters of DI water were added to a 55 gallon mixing tank to engage the impeller. With mixing at about 350 RPM with a marine impeller, the second solution containing the aluminum cations and phosphoric acid was pumped into the tank at 1300 ml/minute. The addition of the ammonium hydroxide through a separate line into the tank was begun immediately, and the rate of addition of base adjusted to maintain a pH of 8.0 in the tank. A hydrogel formed immediately. Reaction was continued until all of the second solution was added.

The hydrogel was washed on a vibrating filtration membrane (as described above) with about 100 gallons of DI water until a conductivity level of about 3000 mmohs was achieved. The hydrogel was pumped onto a large buchner funnel and filtered.

The filter cake was added to a 10 gallon planetary mixer and mixed for about 5 minutes to homogenize the hydrogel into a pumpable material prior to spray drying.

The homogenized hydrogel was pumped to the feed system of a Stark-Bowen BE 1235 spray dryer. The median particle size of the product was 130 microns, and the LOM wt % moisture was 11.4.

The dried hydrogel was calcined in a fixed fluid bed type calciner at 300° C. for eight hours.

The calcined material had the characteristics shown in Table 1 below.

The above dried aluminophosphate was calcined at 300° C. for 8 hours and then submitted for microscopic examination using the standard TEM technique discussed above. FIG. 3 is a photomicrograph at a magnification of 10,800× and shows the presence of only spheres of aluminophosphate. The $N_L$ for the aluminophosphate was, of course, zero $micron^{-1}$.

The above dried aluminophosphate was sent to a third party source for impregnation with a chromium salt to achieve a target level of 0.7 weight percent chromium on the final catalyst after drying and activating at 600° C. for 8 hours. The chromium species was primarily in the +2 state as determined by temperature programmed reduction.

EXAMPLE 2

Example 1 was repeated except the pH of the first solution was about 1.8 and the pH of the nitrate plus the phosphoric acid was less than one. The pH during the formation of the hydrogel was 7.99 to 8.19. No chromium was added. The characteristics of the aluminophosphate are summarized in Table 1 below. Note the $N_L$ was again zero indicating no sheets of aluminophosphate in the microstructure. The median particle size of the spray dried aluminophosphate prior to calcining was 140 microns and the LOM weight percent moisture was 15.4. The TEM photomicrograph at about 11,000 magnification was similar to FIG. 3.

EXAMPLE 3

Example 2 was repeated except the pH of the nitrate solution was 2.2. Again the characteristics of the calcined aluminophosphate are summarized in Table 1 below. Note again the $N_L$ was zero. The median particle size of the dried aluminophosphate prior to calcining was 133 microns and the LOM weight percent moisture was 15.3. The TEM photomicrograph was similar to FIG. 3.

A comparison of Examples 1; 2 and 3 shows that using the prior art technique of preparing the aluminophosphate results in the presence of only spheres of aluminophosphate in the microstructure. In addition the macropore volumes were all considerably less than 0.1 cc's/gram and the fragmentation potential was 30 or less.

B. The following "General Procedure" was used in the preparation of aluminophosphates made in accordance with the invention. The specific amounts of materials and the specific conditions used in the various steps are listed in Table 2 below.

General Procedure

Step 1. Preparation of Solution of Aluminum and Phosphorus Anions (A) 22.5 Kg of hot (50° C.) deionized (DI) water is added to a Jaygo planetary mixer equipped with a water jacket with water circulated in the jacket at room temperature. After turning on the mixer, the desired amount of solid aluminum nitrate (assay 97% $Al(NO_3)_3.9H_2O$) is added in 10 Kg increments until the entire amount is added. Mixing is continued until all solids are dissolved. The pH of the resulting solution is about 1.1.

Phosphoric acid (85.6% $H_3PO_4$) is then added in the desired amount to the mixer. The resulting solution had a pH of less than zero.

(B) A 1:1 volume mixture of ammonium hydroxide (assay 36% $NH_3$) and DI water is prepared.

Step 2—Gelation

The aluminum and phosphorus solution formed in Step 1 and the ammonium hydroxide were simultaneously pumped into the mixing chamber of a Ross-In-Line Laboratory Emulsifier (obtained from Charles Ross and Son Company, Hauppauge, N.Y., Model ME 300L) shown diagrammatically in FIG. 1 (sideview) and FIG. 2 (topview). Referring to FIGS. 1 and 2, the acidic solution of aluminum and phosphorus anions prepared in Step 1A is pumped into the mixing chamber 10 through the outer ¼" inside diameter tube 12 and the ammonium hydroxide solution prepared in Step 1B is pumped into mixing chamber 10 through the inner, ⅛" inside diameter, tube 14. The mixing chamber 10 is fitted with a rotor impeller 16 having four arms and a stationary is cylindrical wall 18 surrounding the rotor impeller 16 and in relatively close proximity to the tips of the impeller arms. The stationary wall 18 is provided with slots 20 through which the fluids and produced hydrogel pass into the annular portions 22 of mixing chamber 10 and then out of the mixing chamber 10 through outer housing 24 and line 26. The acid and base solutions react in the mixing chamber 10 while the rotor impeller 16 operates at the desired revolutions per minute to provide the apparent average shear rate as taught above. The distance between the tip of one arm of impeller 16 and wall 18 is the W" for use in the shear rate equation set forth earlier in this specification. The specific "W" for the mixer-reactor used in the working examples below was 0.01 inches and the diameter "D" of the rotor was 1.355 inches. The rate of addition of the acid and base solutions into the mixing chamber 10 is set to achieve a pH of 8 at the outlet 24. The exothermic reaction of the acid and base solutions is substantially instantaneous to form a hydrogel. Once the pH of the hydrogel is stable at the outlet 24 the hot (58° C.) hydrogel is collected in a 100 gallon tank (not shown). The specific mixer RPM; pH of product hydrogel; temperature (° C.) of the product hydrogel; weight % solids in the hydrogel by LOM (Loss on microwave); rate of addition of base; etc. are shown on Table 2 below for various examples.

Step 3—Aging

The hydrogel from Step 2 was held in the 100 gallon tank until sent to the wash Step 5.

Step 4—Quenching

As noted in Table 2 below, some samples were quenched. Quenching involved adding the hot (55 to 60° C.) hydrogel from the reactor to a stirred tank containing DI water at about 18° C. The temperature in the tank increased about 10° C. as a result of the addition of the hydrogel.

Step 5—Washing

The hydrogel in the holding tank was diluted with hot (50° C.) DI water to about 4 to 10 weight percent solids as measured by an LOM instrument (CEM AVC 80). This dilute hydrogel was washed on a vibrating filtration membrane machine (New Logic International V'SEP machine (Series P) where V'SEP stands for Vibratory Shear Enhanced Processing). This washing process known as difiltration involves dewatering the hydrogel and adding fresh DI water at the same rate at which the filtrate or permeate containing the contaminated salts is removed. The washing is continued until the desired conductivity of the permeate as measured by a conductivity meter (Yokogama Model SC400 conductivity converter) is achieved. Once the desired conductivity was achieved, the hydrogel solution was concentrated to the maximum "pumpable" weight percent solids (by LOM). This was done by dewatering the hydrogel solution by not adding fresh DI water.

Step 6—Drying

The concentrated hydrogel from Step 5 was pumped to the feed system of a Stark Bowen BE 1235 spray dryer and dried. The spray dryer conditions were varied, by means well known to those having ordinary skill in the art, to achieve a desired particle size, LOM moisture weight percent and other desired characteristics.

Step 7—Calcination

The dried hydrogel from Step 6 was calcined in a fixed fluid bed type calciner at 300° C. for eight hours and then allowed to cool. The calcined sample was characterized for physical properties as set forth in Table 1 below. In some Examples below, the aluminophosphate was impregnated with a chromium salt to deposit about 0.5 to 0.7 weight percent chromium on the support. Some samples were sent to a third party for the addition of chromium while others were done in-house. In the in-house procedure, chromium impregnation is done using a Buchi rotovap. A maximum of 50 g of powder is added to a 500 ml rotovap flask. 100 g of water is added to the powder (water to powder ratio is always approximately 2 to 1 by weight). Swirl the flask to achieve uniform wetting of the powder. Weigh $CrO3$ and dissolve in DI water (approximately 15–30 ml). Add the chromium solution to the powder slurry and swirl to evenly coat the powder. Attach flask to the Buchi and spin the flask for approximately 5 minutes without vacuum to mix the slurry. Using a vacuum regulator and vacuum pump, set the vacuum to approximately 400 mm Hg, and lower the flask into an 80° C. water bath. Maintain these conditions until approximately 80% of the water has evaporated. Slowly increase the vacuum to approximately 600 mm Hg as necessary to remove the last of the water without "bumping" any of the slurry/powder over. When the powder appears completely dry increase the vacuum to maximum for approximately 5 minutes. After the last vacuum adjustment is complete release the vacuum & shut off the Buchi. The invention will be further described by reference to the following specific examples.

EXAMPLE 4

The General Procedure set forth above using the high shear mixer was employed with specific amounts of reactants; etc. as set forth in Table 2 below.

FIG. 4 is a photomicrograph of the dried aluminophosphate at about 11,000 ×magnification using the TEM technique. Referring to FIG. 4, it can be seen that both spheres and sheets are present. The $N_L$ determined as set forth above was 0.268.

Chromium was deposited onto the aluminophosphate to result in 0.525 weight percent chromium.

The characteristics of the aluminophosphate are summarized in Table 1 below.

Referring to Table 1, the macropore volume was high at 0.3209 cc's/gm with a fragmentation potential of 49.

The surface area was 100 $m^2$/gram after drying and calcining at 300° C. for eight hours. Example 11 in Table 3 shows the catalyst made from the Example 4 aluminophosphate had a surface area of 98 $m^2$/gram after further calcining at 600° C. for two hours. Thus, the loss of surface area was only 2% showing the thermal stability of the new aluminophosphates.

EXAMPLES 5–7

Example 4 was repeated except for the differences noted in Table 2 below for Examples 5, 6 and 7. The chromium was added in same manner as Example 4.

All of the aluminophosphates from Examples 5–7 contained sheets as well as spheres in their microstructure. TEM photomicrographs at 11,000× magnification (not shown) were similar to FIGS. 4 and 5.

Referring to Table 1, which summarizes aluminophosphate characteristics, all of the macropore volumes were above 0.1 cc's/gm and the fragmentation potential was 30 or above.

EXAMPLE 8

Figure 5:
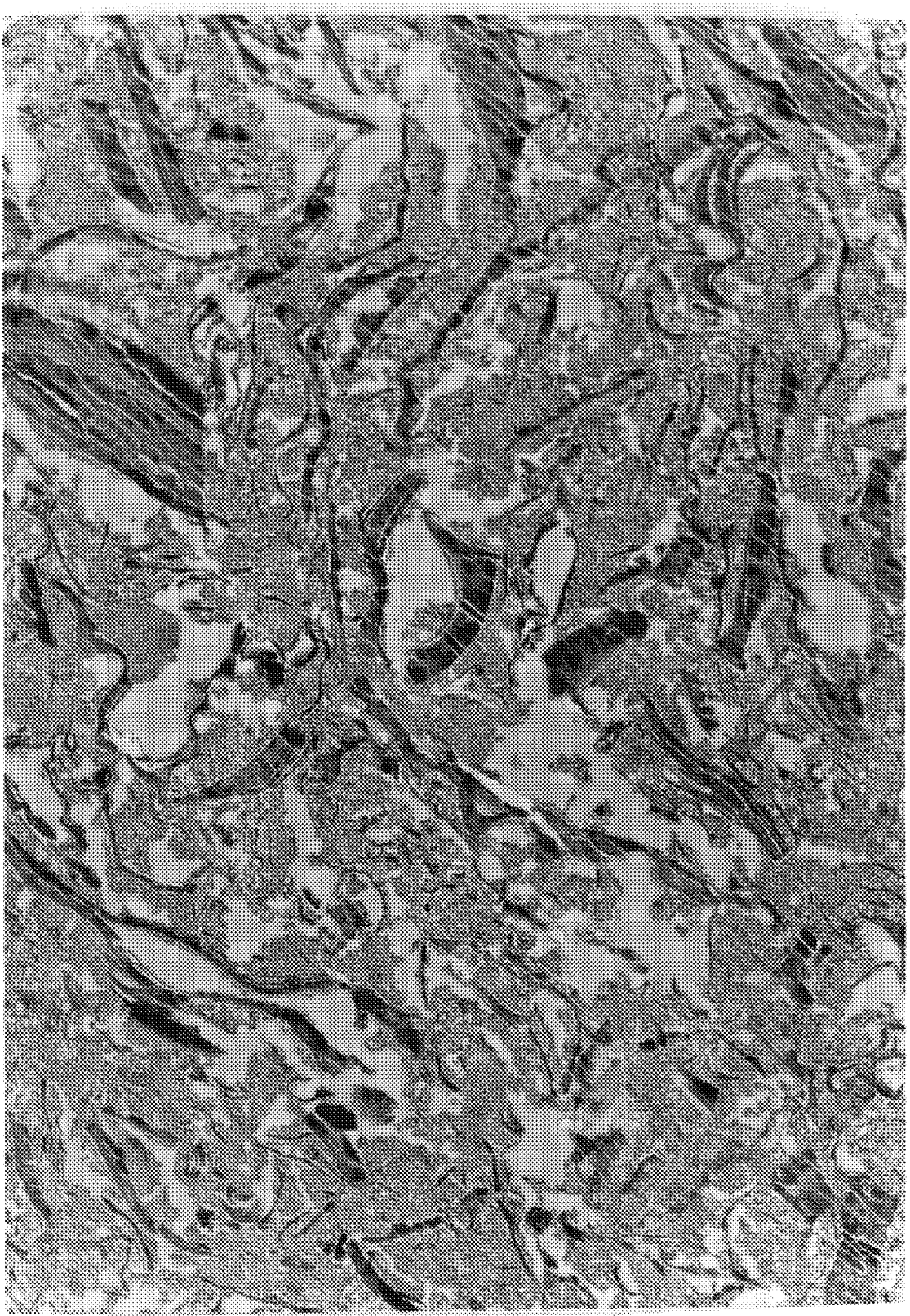
Figure 6:
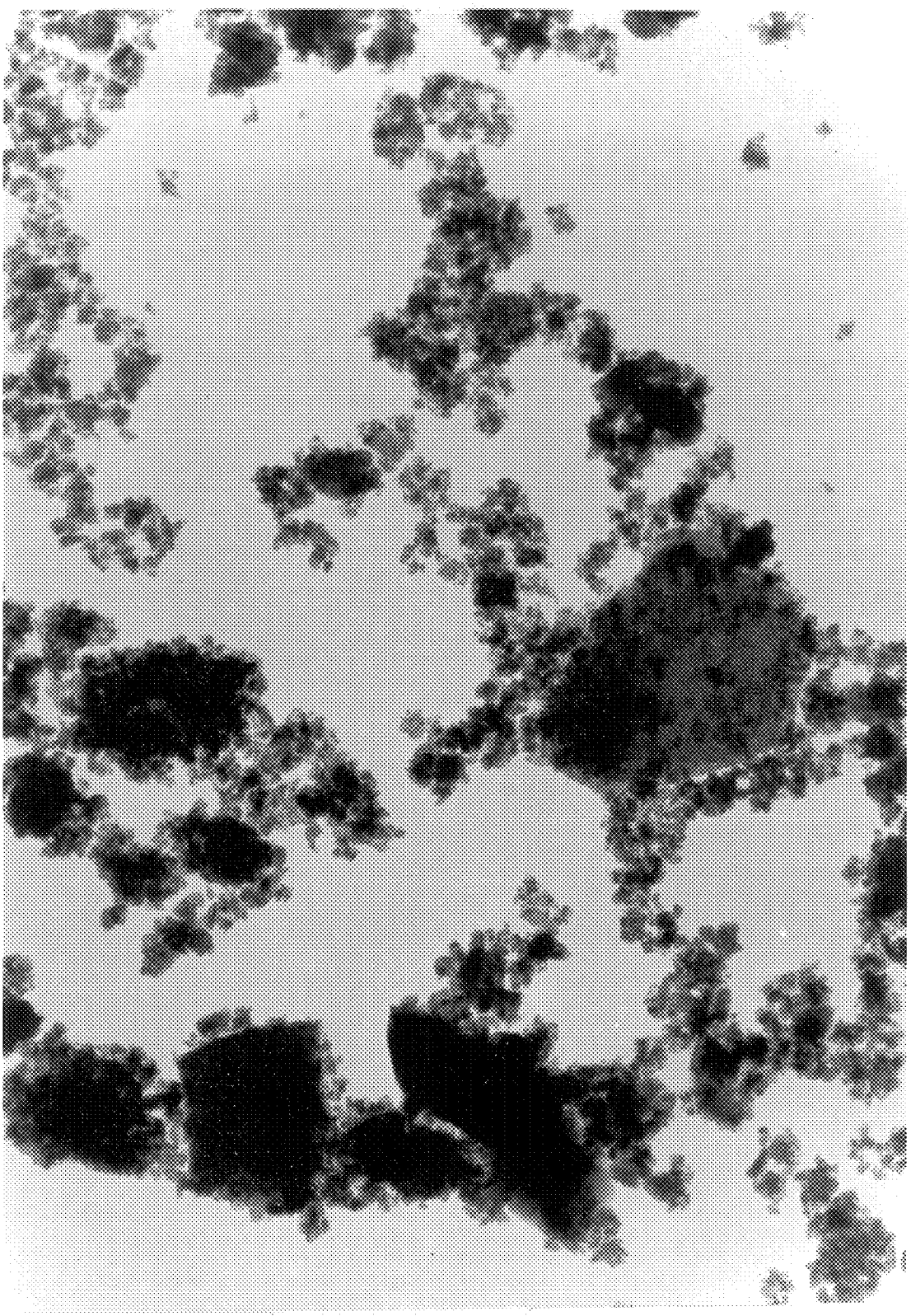

The aluminophosphate for this example is a blend of the aluminophosphates made in Examples 5, 6 and 7 above. The characteristics are shown in Table I below. Referring to Table 1, the macropore volume was high at 0.21 cc's/gm with a fragmentation potential of 50 with an $N_L$ of 0.616. FIG. 5 is a TEM photomicrograph at about 11,000× magnification. Comparing FIGS. 4 & 5 it can be seen that more sheets are present in FIG. 5. This conforms to the $N_L$'s which for FIG. 4 was 0.268 and for FIG. 5 was 0.616.

The data in Table 1 for Example 8 shows a surface area for the aluminophosphate of 93 m²/gram. As noted, this was after drying and calcining at 300° C. for 8 hours. This should be compared to the data on surface area in Table 3, Example 11, which used the support from Example 8. This catalyst was activated at 600° C. for two hours. The surface area was 76 m²/gram showing a loss of surface area of only 18% on further calcining at 600° C.

The catalysts made in Examples 1, 2, and 8 above were tested for use as ethylene polymerization catalysts in a continuous gas phase pilot plant reactor as shown in corresponding Examples 9, 10 and 11 in Table 3 below. The pilot plant reactor is a small fluidized bed reactor with feed inlet near the bottom for ethylene or other gaseous monomers or co-monomers plus hydrogen.

The reactor temperature was about 215° F. to 218° F. The partial pressure of ethylene was 85%. The runs are summarized in Table 3 below.

Referring to Table 3, Examples 9 and 10 used the catalysts prepared in the method of the prior art and the ash content of the polymer product was in the 700 to 1000 ppm range. Ash level is a measure of catalyst activity.

It should be noted that Example 11 used the catalyst of Example 8, i.e. the catalyst of this invention. The Example 11 catalyst had a high macropore volume well over 0.1 cc's per gram together with a high fragmentation potential of about 50. In addition sheets of aluminophosphate were present in the microstructure.

Despite this high macropore volume and fragmentation potential, the catalyst of Example 11 was physically strong enough to be satisfactory for use in a fluid bed process for the polymerization of ethylene. The ash content of the product as shown on Table 3 was a surprisingly low 20–50 for Example 11 showing this catalyst was considerably more active than the catalyst made by the methods of the prior art (Examples 9 and 10.) It should be noted that the ash level of the polymer product using a commercial chromia on silica catalyst (the so-called GC-4 catalyst) is on the order of 200 to 400 ppm. Thus the catalyst of this invention surprisingly give activities without the use of a co-catalyst which are an order of magnitude greater than commercially used catalysts. Further, the ash level of the polymer products is so low that the polymer products can be used even for the demanding film market uses in addition to their usefulness as pipe resin, etc.

EXAMPLE 12

Example 4 was repeated except for the changes noted in Table 2 below. In addition, the product at 55° C. was quenched by addition to a 55 gallon tank holding 10 gallons of DI water with mixing. The tank was jacketed with circulating room temperature cooling water. The temperature in the tank increased form 19° C. to 26° C.

The characteristics of the aluminophosphate are set forth in Table I below. Referring to Table 1, the fragmentation potential was high at 76 along with a high macropore volume at 0.38 cc's/gram and a high mesopore volume at 0.68 cc's/gram. Note the quenching reduced the mean mesopore diameter and increased macropore volume (compare Examples 8 and 12).

A TEM photomicrograph at about 11,000× magnification is shown as FIG. 7. The $N_L$ was 0.439 micron$^{-1}$.

EXAMPLE 13

The method of Example 4 was repeated except a different source of aluminum was used i.e. 32 BE AlCl$_3$ (Rehies solution) was used in lieu of the aluminum nitrate. The changes are shown in Table 2 below.

A TEM photomicrograph (not shown) at 10,800× for the dried aluminophosphate from Example 13 showed the presence of both spheres and sheets in the microstructure. The physical characteristics of the calcined aluminophosphate from Example 13 are shown in Table 1 below. Referring to Table 1, it can be seen that the macropore volume was 0.176; the fragmentation potential was 50 and sheets were present in the microstructure. Thus, various sources of aluminum can be used to prepare the new aluminophosphate compositions of this invention.

EXAMPLE 14

The method of Example 4 was repeated except Na$_2$PO$_4$.12 H$_2$O was used in place of phosphoric acid; Na$_2$O-Al$_2$O$_3$.3 H$_2$O was used in place of the aluminum nitrate; and neutralization occurred using 33.33 weight percent hydrochloric acid. Sodium Hydroxide was added to increase the pH to 12.9. The changes are listed below in Table 2.

A TEM microphotograph (not shown) at 10,800× for the dried aluminophosphate from Example 14 showed that both spheres and sheets are present. The macropore volume was 0.033 cc's/gram and the fragmentation potential was 29. The physical characteristics are shown in Table 1 below. It can be seen from a comparison of Example 14 with Examples 4–7 and 13 that the novel sheet containing aluminophosphates can be made from aluminum sources, both basic and acidic.

EXAMPLE 15

Example 4 was repeated except for the differences noted in Table 2 below. The resulting aluminophosphate had sheets as well as spheres; a TEM photomicrograph (not shown) was similar to FIG. 4. The physical characteristics are summarized in Table 1.

Referring to Table 1, it can be seen the product has a high macropore volume and fragmentation potential.

A series of runs were made to study the effect of varying the RPM of the rotor and the configuration of the stator on the production of sheets as well as spheres in the microstructure. The variation of the RPM changes the apparent average shear rate, as discussed above. In addition, the concentration of the reactants was varied, as was the P/Al mole ratio in the product to again determine the effect on the production of sheets as well as spheres in the microstructure. $N_L$'s were not determined for any products.

The aluminophosphates for Examples 16, 17, and 18 were prepared substantially in accordance with the procedure of Example 4, except for the more significant changes shown on Table 4 below. Example 8 data are also shown on Table 4 for ease of comparison with Examples 16–18.

Referring to Table 4, Examples 16 and 17 were the same except the shear rate for Example 16 is twice the shear rate of Example 17. Each product had sheets.

A comparison of Examples 16 and 18 shows that sheets are formed in the product at the relatively low concentration of $NO_3$ (0.477 for Example 16) or high concentration of $NO_3$ (2.31 for Example 18).

All of the runs in a second series (Examples 19–26 below) were the same as the preparation described in Example 4 above, except for the changes listed in Table 4 below. None of the aluminophosphates was washed. The dried aluminophosphate in each of Examples 19–26 in Table 4 below was characterized by TEM and the presence or absence of sheets noted.

Referring to Table 4, Example 19 shows that, at a shear rate of about $0.3 \times 10^4$ sec$^{-1}$, a dense continuous mass was formed which showed no sheets or spheres in its microstructure when analyzed by TEM. Example 20 is a duplicate of Example 19 except the shear rate was increased to $0.92 \times 10^4$ sec$^{-1}$, and sheets were noted in the product.

Examples 21 and 22 were duplicates except the apparent average shear rate was lower in Example 22. Sheets were present in the microstructure of both products.

Examples 21 and 23 were substantially the same except a screen was used as the stator in Example 23, versus a slotted stator in Example 21. Example 24 was similar to Example 23 except the P to Al mole ratio was about 0.5 for Example 24 compared to about 1 for Example 23. Fewer sheets were noted in the microstructure for the product from Example 24. Substantially no differences were noted in the products. Example 26 was similar to Example 25 except the concentrations of N03 was much higher in Example 26 i.e. 69.8 weight percent compared to 12.6 weight percent for Example 25. The pH was difficult to control in Example 26 and the screen clogged. A higher concentration of salts requires a stator with longer openings.

Example 25 used a relatively high shear rate ($3.54 \times 10^4$ sec$^{-1}$) but the concentration of $NO_3$ was quite low, at 0.1448 kg $NO_3$ per kg of $H_2O$. The concentration of sheets in the product was decreased. It is thus preferred to use a higher concentration of aluminum ions in the feed solution.

EXAMPLE 27

The aluminophosphate for this example was prepared in a manner similar to Example 18 above, except the wash temperature was 50° C. rather than ambient. Table 1 lists the physical characteristics. A comparison of Examples 18 and 27 on Table 1 shows the effect of hot washing in increasing the mean mesopore diameter and mean mesopore volume of the product aluminophosphate.

EXAMPLE 28

Example 15 was repeated except the quantities of feed materials were cut in half and the product was extensively washed on the V*SEP until the conductivity was 53 mmohs (compared to a conductivity of 3000 mmohs for example 27). The characteristics of the aluminophosphate are shown in Table 1, and the variables on preparation in Table 2.

Referring to Table 1, a comparison of Examples 28 and 15 show that extensive washing results in an increase in surface area, but significantly reduced macropore volume and mean mesopore diameter. The material from Example 28 was also quite harder, having a fragmentation potential of only 15.

It was noted that the product which separated during calcination showed the presence of alumina by x-ray diffraction. All of the other working Examples are x-ray diffraction amorphous.

Further, and most surprising, a TEM photomicrograph at 10,800 times showed there were no sheets present in the product aluminophosphate.

Referring to Table 2, the products in Example 13 and 14 were washed to a conductivity level of 500 and 1000 mmohs respectively, and sheets were present in the products, as shown on Table 1.

While not wishing to be bound by any theory, it appears that a certain level of residual salts is necessary to stabilize the structure of the aluminophosphate. Washing to remove salts, e.g. nitrates, is usually done to lower the level of nitrogen or other unwanted salts, which may tend to poison metallic catalysts, such as chromium, which is later deposited on the aluminophosphate.

EXAMPLE 29

Example 27 was repeated except the P to Al mole ratio was 0.24. The details of preparation and the product properties are summarized on Tables 2 and 1 respectively. Example 29 is also summarized in Table 4 to show the reduction in P to Al mole ratio did not adversely affect sheet formation.

Referring to Table 1, sheets were present in the product in addition to a large macropore volume; a large mesopore volume and a high fragmentation potential.

This Example illustrates that aluminophosphates within the purview of this invention can be prepared using P to Al mole ratio of 0.24.

Applicants invention will be further defined, but not limited, to the claims below:

What is claimed is:

1. A new aluminophosphate composition of matter wherein the phosphorus to aluminum mole ratio is less than one and characterized further as: (a) amorphous; and (b) having, in its microstructure, sheets of aluminophosphate as well as spheres of aluminophosphate.

2. A composition in accordance with claim 1 wherein the phosphorous to aluminum mole is from 0.2:1 to about 1:1.

3. A composition in accordance with claim 2 wherein the aluminophosphate has a macropore volume of at least 0.1 cc's per gram.

4. A composition in accordance with claim 1 wherein the aluminophosphate has a fragmentation potential of at least 30.

5. A composition according to claim 2 wherein said aluminophosphate has a macropore volume of at least 0.1 cc's per gram and the fragmentation potential of at least 30.

6. A composition in accordance with claim 3 wherein the surface area is from 90 to 300 square meters per gram.

7. A composition according to claim 1 wherein the $N_L$ in a photomicrograph at about 12,000× magnification is from 0.1 to 3 micron$^{-1}$.

8. A composition according to claim 5 where the $N_L$ in a photomicrograph at about 12,000× magnification is from 0.15 to 1.5 micron$^{-1}$.

9. A composition in accordance with claim 5 wherein the mesopore volume is from 0.3 to 0.8 cc's per gram.

10. A composition in accordance with claim 9 wherein said composition has substantially no pores less than 20 Å.

11. A composition in accordance with claim 9 wherein the $N_L$ in a photomicrograph at about 12,0000× magnification is from 0.3 to 1 micron$^{-1}$.

12. A composition having a TEM photomicrograph at about 12,000 magnification substantially as shown in FIG. 5.

13. A method of preparing an amorphous aluminophosphate having a phosphorus to aluminum mole ratio less than one which comprises:
  (a) forming a first aqueous solution of aluminum and phosphorus ions wherein the mole ratio of the phosphorus ions to the aluminum ions is 1:1 or less;
  (b) forming a second aqueous solution capable of neutralizing said first aqueous solution;
  (c) contacting said first and second aqueous solutions in a mixer-reactor under mixing conditions with sufficient shear to produce an aluminophosphate precipitate having in its microstructure both sheets and spheres of aluminophosphate, said shear being at a rate of at least $0.5 \times 10^4$ sec$^{-1}$; and wherein said aluminophosphate is removed from the mixer-reactor substantially as quickly as it is formed.

14. A method according to claim 13 wherein said first aqueous solution is a solution of aluminum cations and phosphate anions and wherein the neutralizing medium is a second aqueous solution having a pH above 8.

15. A method according to claim 14 wherein said second aqueous solution is an ammonia based material selected from the group consisting of ammonium hydroxide; ammonium carbonate; ammonium bicarbonate and urea.

16. A method according to claim 15 wherein the first aqueous solution is a solution of an aluminum salt and phosphoric acid.

17. A method according to claim 15 wherein the concentration of aluminum salt in said first solution is from 30 to 70 weight percent.

18. A method according to claim 13 wherein said first aqueous solution is a basic solution of aluminum and phosphorus anions and the second aqueous solutions is an acidic solution with a pH less than 6.

19. A method according to claim 18 wherein said first solution is an aqueous solution of sodium salts of aluminum and phosphorus and said second aqueous solution is hydrochloric acid.

20. A method according to claim 16 wherein said mixer-reactor is a rotor-stator type mixer.

21. A method according to claim 13 wherein said contacting is from 0.5 to 5.0 seconds.

22. A method according to claim 13 wherein said precipitate is continuously washed on a vibrating filtration membrane to reduce the conductivity of the effluent water to a value less than the starting conductivity but greater than about 500 mmohs.

23. A method according to claim 13 wherein the shear rate is from $1 \times 10^4$ sec$^{-1}$ to $10 \times 10^4$ sec$^{-1}$.

24. A method in accordance with claim 21 wherein said neutralization step is conducted in such a manner that the pH of the combined first aqueous solution and the neutralizing medium is controlled in the range of 6 to 11.

25. A method in accordance with claim 24 which comprises the additional steps of quenching said aluminophosphate precipitate with a sufficient amount of water to reduce the temperature of the reaction medium to from 18 to 30° C. and recovering said aluminophosphate precipitate.

26. A method according to claim 24 wherein said precipitate is continuously washed on a vibrating filtration membrane to reduce the conductivity of the effluent water to a value less than the starting conductivity but greater than about 500 mmohs.

27. A method in accordance with claim 26 wherein the water temperature is controlled at 50 to 80° C.

28. A method in accordance with claim 26 wherein the solids content after washing on the vibrating filtration membrane is increased to 12 to 22% weight.

29. A method according to claim 28 wherein said precipitated solids are dried and thereafter calcined at a temperature from 300 to 600° C. for from 1 to 16 hours.

30. A method in accordance with claim 29 wherein said drying is spray drying to obtain a desired particle sized product.

31. A method according to claim 26 wherein the conductivity of the effluent water is from about 2000 to 4000 mmohs.

* * * * *